United States Patent
Kim et al.

(10) Patent No.: US 8,338,730 B2
(45) Date of Patent: Dec. 25, 2012

(54) LIGHTING GUIDE KEYPAD AND LIGHTING GUIDE KEYPAD ASSEMBLY

(75) Inventors: Jin Hae Kim, Seoul (KR); Woo Yeon Cho, Gyeonggi-do (KR); Hyo Min Lee, Choongcheongpuk-do (KR)

(73) Assignee: Curling Creative Consult Inc., Tokyo (JP)

( * ) Notice: Subject to any disclaimer, the term of this patent is extended or adjusted under 35 U.S.C. 154(b) by 246 days.

(21) Appl. No.: 12/679,451

(22) PCT Filed: Sep. 2, 2008

(86) PCT No.: PCT/KR2008/005148
§ 371 (c)(1),
(2), (4) Date: Mar. 22, 2010

(87) PCT Pub. No.: WO2009/038295
PCT Pub. Date: Mar. 26, 2009

(65) Prior Publication Data
US 2010/0200382 A1    Aug. 12, 2010

(30) Foreign Application Priority Data

Sep. 21, 2007   (KR) .................. 10-2007-0096792

(51) Int. Cl.
*H01H 9/00*   (2006.01)
(52) U.S. Cl. ...................................... 200/314
(58) Field of Classification Search .......... 200/310–317, 200/406, 516, 517; 341/20, 22, 23, 28; 345/168–170; 235/145 R
See application file for complete search history.

(56) References Cited

U.S. PATENT DOCUMENTS

| | | | |
|---|---|---|---|
| 5,408,060 A * | 4/1995 | Muurinen | 200/314 |
| 5,934,450 A | 8/1999 | Rynk et al. | |
| 7,429,709 B2 | 9/2008 | Kim | |
| 7,893,375 B2 * | 2/2011 | Chang et al. | 200/314 |
| 7,947,915 B2 * | 5/2011 | Lee et al. | 200/314 |
| 7,994,445 B2 * | 8/2011 | Aihara et al. | 200/314 |
| 2004/0188639 A1 | 9/2004 | Masuda et al. | |
| 2007/0057031 A1 | 3/2007 | Lee | |
| 2007/0205088 A1 | 9/2007 | Lee et al. | |

FOREIGN PATENT DOCUMENTS

| | | |
|---|---|---|
| KR | 200400532 | 11/2005 |
| KR | 20060007252 | 1/2006 |
| KR | 20060087165 | 8/2006 |
| KR | 10-0676480 | 1/2007 |
| KR | 100779065 | 11/2007 |
| KR | 20070113745 | 11/2007 |
| KR | 10-0832546 | 5/2008 |
| WO | WO-2007/100180 | 9/2007 |

* cited by examiner

*Primary Examiner* — Edwin A. Leon
(74) *Attorney, Agent, or Firm* — Jordan and Hamburg LLP

(57) ABSTRACT

The present invention relates to a light guiding keypad and a light guiding keypad assembly. More particularly, the present invention relates to a light guiding keypad and light guiding keypad assembly which can reduce the number of components of mobile phones by forming line type or surface type of key character patterns on one surface of a light guiding plate of a mobile phone that receives lights through its side surface and thus making the light guiding plate perform as keypad. The key character patterns are formed by printing paste having diffusion and reflection features.

18 Claims, 4 Drawing Sheets

LIGHTING GUIDE KEYPAD AND LIGHTING GUIDE KEYPAD ASSEMBLY

BACKGROUND OF THE INVENTION

The present invention relates to a light guiding keypad and a light guiding keypad assembly. More particularly, the present invention relates to a light guiding keypad and light guiding keypad assembly which can reduce the number of components of a mobile phone by forming key character patterns on one surface of a light guiding plate of a mobile phone that receives lights through its side surface and thus making the light guiding plate perform as keypad.

As competitions in current mobile phone market get serious, some manufacturers are trying to find niche market where the other manufacturers do not focus, rather than consistently maintaining a market policy of pursuing high quality and high price products. As one of these trends, some manufacturers attempt to find a new breakthrough by producing low price mobile phones with implementation of only necessary functions rather than implementation of high quality functions.

Although these trends to produce such low price mobile phones are not considered, it is an outstanding issue in this field to achieve equal performance with minimum cost, components and time.

In order to meet customers' demand for slim mobile phones, mobile phone manufacturing industries has reduced thickness of mobile phones through development of thinner batteries than that of the early days of manufacturing mobile phones. However, means replacing conventional keypads in keypad assembly necessary for achieving performance of mobile phones has not been developed so that it has been considered that conventional keypad structure including keytop part and keybase part should be included in the keypad assembly.

In the mean time, various types of light sources have been used for illuminating key pad assembly of mobile phones and concept of using light guiding plates of transparent material has been introduced through the applicant's Korean utility model application No. 2007-14206 (Title: A printing type lighting guide sheet for light source) etc. to solve problems of the conventional light sources. However, no one in this field expects that the light guiding plate can replace the keypad.

SUMMARY OF THE INVENTION

The present invention is to solve many problems of the conventional light sources like over consumption of electric power, poor luminance, requirement of extra components, etc. and to provide a new type of luminescence-combined light guiding keypad and a light guiding keypad assembly which can replace the keypad of the conventional keypad structure requiring extra luminescence.

There is provided with the light guiding keypad according to the first preferred embodiment of the present invention, wherein a light guiding plate of transparent material used in keypad assembly provides lights received from light source connected to its side surface to upper part of the keypad assembly, wherein key character patterns are formed on one surface of the light guiding plate by means of printing, and wherein the light guiding plate is flexible enough to be able to bend.

Preferably, the key character patterns can be formed as line type or surface type and some of the key character patterns are color patterns.

There is provided with a light guiding keypad assembly according to the second preferred embodiment of the present invention, wherein a light guiding plate of transparent material providing lights received from light source connected to its side surface to upper part of the keypad assembly is used in the keypad assembly, wherein line or surface type of key character patterns are formed on one surface of the light guiding plate by means of printing, and wherein the light guiding plate is flexible enough to be able to bend. The printed key character patterns can be implemented to have various colors.

Preferably, the light guiding keypad assembly further comprises a coating layer which is located on the light guiding plate to cover some part or whole part of the light guiding plate.

Preferably, the light guiding keypad assembly further comprises a backboard sheet below the light guiding plate, wherein drawings or pictures are formed on one surface of the backboard sheet.

Preferably, the light guiding keypad assembly further comprises an actuator which is located below the light guiding plate and which comprises protruding parts corresponding to each key character patterns to have press contacts with dome switches.

There is provided with a light guiding keypad assembly according to the third preferred embodiment of the present invention, wherein a light guiding plate of transparent material providing lights received from light source connected to its side surface to upper part of the keypad assembly is used in the keypad assembly, wherein the light guiding keypad assembly comprises a backboard sheet below the light guiding plate, wherein drawings or pictures are formed on one surface of the backboard sheet and wherein key character patterns of line or surface type are formed on one surface of the light guiding plate by means of printing.

Preferably, the light guiding keypad assembly further comprises an actuator which comprises protruding parts formed corresponding to locations of dome switches to have press contacts with dome switches, so as to operate dome switches for activating the light source connected to the side surface of the light guiding plate.

Preferably, the actuator is formed on the backboard sheet by means of printing.

There is provided with a light guiding keypad assembly according to the fourth preferred embodiment of the present invention, comprising: a light guiding plate and a transparent ink layer, wherein the light guiding plate of transparent material provides lights received from light source connected to its side surface to upper part of the keypad assembly, wherein line or surface type of key character patterns are formed on one surface of the light guiding plate by means of printing, wherein the transparent ink layer is formed, on the surface where the key character patterns are printed, to cover the key character patterns, and wherein drawings or pictures are printed on the transparent ink layer to allow various designs of the keypad.

Preferably, the light guiding keypad assembly further comprises: a coating layer for covering some part or whole part of the light guiding plate.

Preferably, the light guiding keypad assembly further comprises: an actuator which comprises protruding parts formed corresponding to locations of dome switches to have press contacts with dome switches, so as to operate dome switches for activating the light source connected to the side surface of the light guiding plate.

Preferably, the actuator is formed, by means of printing, on the transparent ink layer with the drawings or pictures printed.

There is provided with a light guiding keypad assembly, comprising: a light guiding plate and a key character printed layer, wherein the light guiding plate of transparent material provides lights received from light source connected to its side surface to upper part of the keypad assembly, wherein surface pattern is formed on some part of one surface of the light guiding plate by printing materials having diffusion features, wherein the key character printed layer having key character areas corresponding to areas of the surface pattern on the light guiding plate is located above the light guiding plate, and wherein the key character printed layer is formed with equal thickness leaving the shape of key characters of the key character areas empty.

Preferably, the material with diffusion features can be printed as one of surface type, dot type, or halftone type.

Preferably, the light guiding keypad assembly further comprises a transparent ink layer of transparent material formed on one surface of the light guiding plate, wherein the key character printed layer is formed on the transparent ink layer.

Preferably, the light guiding keypad assembly further comprises a backboard sheet below the light guiding plate, wherein drawings or pictures are formed on one surface of the backboard sheet.

Preferably, the light guiding keypad assembly further comprises an actuator which comprises protruding parts formed corresponding to locations of dome switches to have press contacts with dome switches, so as to operate the dome switches for activating the light source connected to the side surface of the light guiding plate, wherein the actuator is printed on the backboard sheet.

By employing the light guiding keypad of the present invention, extra keypad structures are no longer needed. So thickness of the light guiding keypad assembly becomes thin and thus thickness of mobile phones becomes thin. Further, the present invention has an effect of saving costs because processes of manufacturing keypad assembly are quite simple while conventional processes of manufacturing keypad assembly are complex and consist of many steps.

Further, the present invention has another effect of further improving design of conventional simple keypad design by insertion of backboard sheet made of various materials or having various printed colors or patterns.

DETAILED DESCRIPTION OF THE INVENTION

Figure 6B:
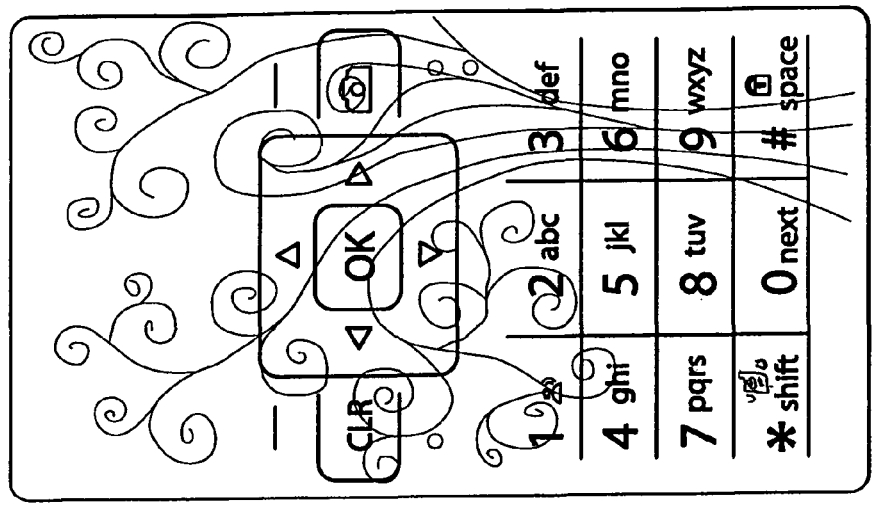
Figure 6A:
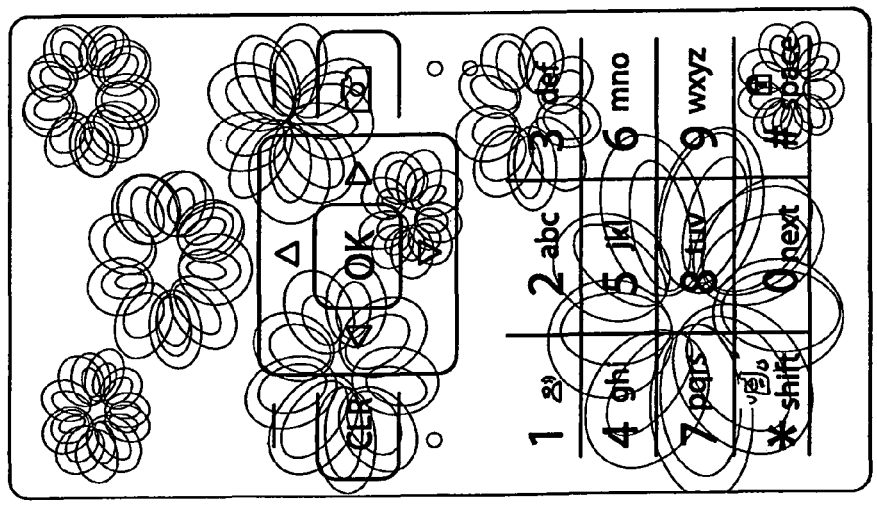

FIGS. 6(A) and 6(B) illustrates a light guiding keypad assembly of the present invention.

DETAILED DESCRIPTION OF THE INVENTION

Hereinafter, preferred embodiments of the present invention will be explained in detail with reference to the attached drawings.

Figure 1:
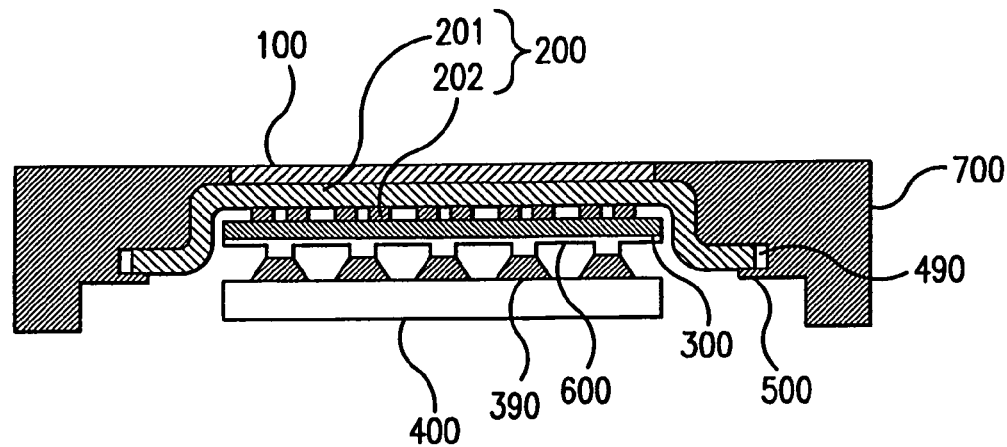
FIG. 1 illustrates a cross section of a light guiding keypad assembly according to the first preferred embodiment of the present invention.

FIG. 1 illustrates a cross section of a light guiding keypad assembly according to the first preferred embodiment of the present invention. The light guiding keypad assembly according to this preferred embodiment comprises a light guiding plate 201 which is a path delivering lights supplied from lighting means such as LED etc. connected to a side surface of the light guiding plate. Key character patterns 202 are formed on the bottom surface of the light guiding plate 201 by being printed as line type or surface type. The key character patterns here indicate various types of characters, numbers and symbols etc. formed on the conventional keypad by printing, etc. The key character patterns formed on the bottom surface of the light guiding plate 201 can be implemented to have various colors by printing color-added paste with diffusion and reflection features.

It is preferable to use plates made of materials having high transparency such as PC, PE, PET, PU, PMMA, glass, etc. as the light guiding plate 201 in the light guiding keypad assembly. The key character pattern is formed by materials with diffusion and reflection features so that lights supplied from light source 490 connected to a side surface of the light guiding plate 201 travels through the light guiding plate 201 and are diffused and reflected by the key character patterns. The key character patterns are formed on one surface of the light guiding plate 201 by screen printing, offset printing, pad printing etc. It is not necessary to form the key character patterns on the bottom surface of the light guiding plate 201 as illustrated in FIG. 1. Depending on necessities, the key character patterns can be formed on both surfaces of the light guiding plate 201.

A backboard sheet 300 is placed below the key character patterns. The backboard sheet 300 allows implementation of various designs of key pad assembly. The backboard sheet 300 can be produced by using various materials such as plastic, PE, PC, PET, paper, lather, SUS, fabric, etc. Drawings or pictures formed on the backboard sheet 300 can be observed from outside of the keypad assembly. The backboard sheet can be obtained by using a variety of shapes of materials or by processing the materials in various ways such as printing, scratching, carving, etc.

On the bottom surface of the backboard sheet 300, there is provided with an actuator 600 formed corresponding to each character patterns to have press contacts with dome switches. The actuator comprises protruding parts having substantially press contacts with the dome switches 390. The actuator made of different material can be attached to the bottom surface of the backboard sheet 300 by means of double-sided tape, an adhesive, a bonding agent, etc. or can be formed by being printed on the bottom surface of the backboard sheet 300 as an integrated one.

In the meantime, different from the illustration of FIG. 1, for a light guiding keypad package not including the backboard sheet 300, it is possible to place the backboard sheet 300 on the bottom surface of the light guiding plate 201 so that it is also possible to attach an actuator made of different materials to the bottom surface of the light guiding plate 201 using many means illustrated above.

Figure 3:
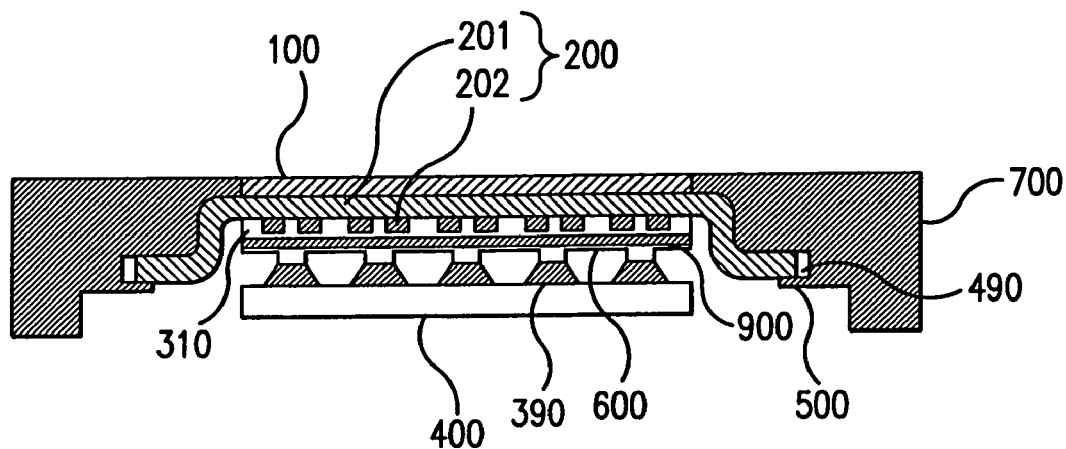
FIG. 3 illustrates a cross section of a light guiding keypad assembly according to the third preferred embodiment of the present invention.

Further, like the preferred embodiment illustrated in FIG. 3, it is possible to form the actuator by forming a transparent ink layer on one surface of the light guiding plate 201 where key character patterns are formed, to cover the key character patterns and, then, by printing the actuator on the transparent ink layer having protruding parts corresponding to the key character patterns.

Explanations on the structure of the actuator's having press contacts with corresponding dome switches and then activating light source connected to the side surface of the light guiding plate 201 have been described in the applicant's prior utility model applications etc. So they will be omitted because the applicant assumes that the ordinary skilled in the art will have no problem in practicing the present invention even without describing the explanations here.

Coating layer 100 for preventing contamination or damages of the light guiding plate is placed right on the top surface of the light guiding plate. Such coating layer 100 can be selectively employed depending on degree of hardness of the light guiding plate 201. The method of forming the coating layer also will not be described in detail here because it is okay to follow conventional coating method.

Figure 2:
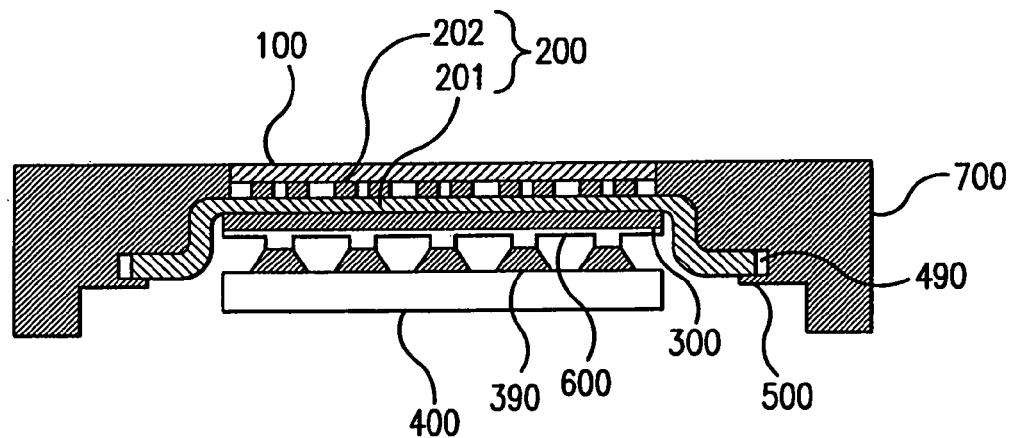
FIG. 2 illustrates a cross section of a light guiding keypad assembly according to the second preferred embodiment of the present invention.

FIG. 2 illustrates a cross section of the light guiding keypad assembly according to the second preferred embodiment of the present invention.

The light guiding keypad assembly illustrated in FIG. 2 is different from the light guiding keypad assembly illustrated in FIG. 1 in that key character patterns 202 are formed on the top surface of the light guiding plate 201. In case of implementing the present invention without forming the coating layer 100, it is possible for the user of mobile phones to feel tough of the key character patterns.

FIG. 3 illustrates a cross section of the light guiding keypad assembly according to the third preferred embodiment of the present invention.

The light guiding keypad assembly illustrated in FIG. 3 is equal to the light guiding keypad assembly illustrated in FIG. 1 when it comes to the following structures: line or surface types of key character patterns are printed on the bottom surface of the light guiding plate 201; coating layer 100 is formed on the top surface of the light guiding plate 201; the actuator and dome sheet are placed below the light guiding plate 201; the light guiding plate 201 is flexible enough to be able to have bending portions; and LED 490 providing lights and FPCB 500 operating the LED are connected to the side surface of the light guiding plate 201. On the other hand, the light guiding keypad assembly illustrated in FIG. 1 comprises the backboard sheet for keypad design below the light guiding plate 201, while the light guiding keypad assembly illustrated in FIG. 3 comprises, rather than the backboard sheet, keypad design layer 900 consisting of drawings or pictures, etc. for keypad design on the transparent ink layer 310 which is placed on the bottom surface of the light guiding plate 201. That is, according to the preferred embodiment illustrated in FIG. 3, key character patterns are formed on the bottom surface of the light guiding plate 201, the transparent ink layer 310 is formed over the whole surface where the key character patterns are formed, to cover all the patterns, and then, the keypad design layer 900 is formed on the transparent ink layer 310 by means of printing. The drawings or pictures printed as the keypad design layer 900 are implemented with various shapes and colors.

Figure 4:
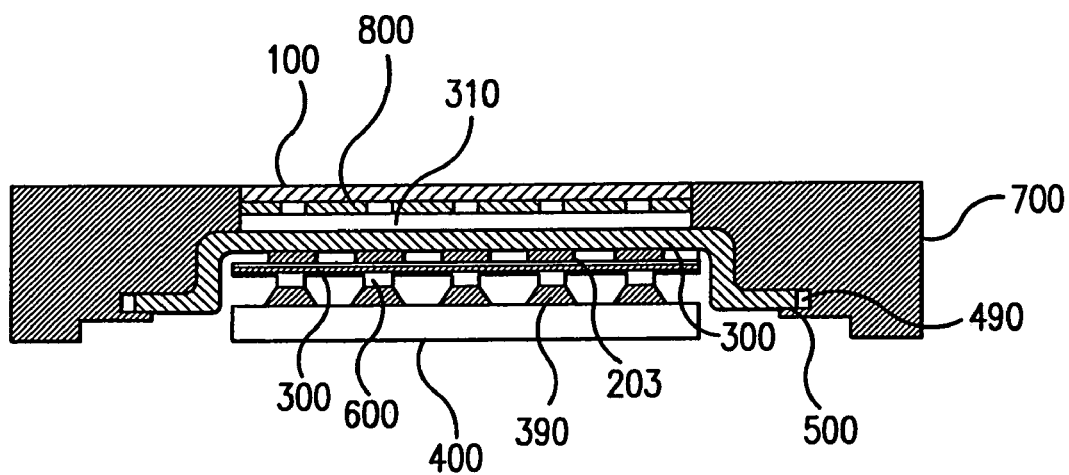
FIG. 4 illustrates a cross section of a light guiding keypad assembly according to the fourth preferred embodiment of the present invention.

FIG. 4 illustrates a cross section of light guiding keypad assembly according to the fourth preferred embodiment of the present invention.

The light guiding keypad assembly illustrated in FIG. 4 comprises a light guiding plate 201 having bending portions configured to deliver lights received from light source 490 connected to side surface of the light guiding plate 201 to upper part of the keypad assembly. Different from the preferred embodiments illustrated in FIGS. 1, 2 and 3, diffusion ink layer 203 are formed on some parts of the bottom surface of the light guiding plate by means of dot printing, surface printing or halftone printing, etc. The light guiding keypad assembly comprises: the diffusion ink layer 203 placed below the light guiding plate 201; backboard sheet 300 placed below the diffusion ink layer 203 for keypad design; actuator 600 placed below the backboard sheet for delivering stimulation caused by pressing the backboard sheet to the dome switches 390; dome sheet 400 comprising the dome switches 390 arranged corresponding to locations of protruding parts of the actuator 600 so as to operate depending on operation of the actuator 600; transparent ink layer 310 uniformly formed over the top surface of the light guiding plate 201; key character printed layer 800 formed on the transparent ink layer 310; and, coating layer 100 placed on the key character printed layer 800 for protecting the components below the key character printed layer 800 from contamination and damages caused by stimulation from outside.

For forming the key character printed layer 800, it is possible to form the key character printed layer 800 by inputting the appropriate materials into only parts that are not the shape of key characters to be formed, similar to the method of using masks with empty spaces corresponding to the shape of key characters. Accordingly, lights supplied through the diffusion ink layer 203 which is formed by surface, dot, halftone printing are emitted through the empty spaces of the key character shapes.

The actuator 600 is formed by printing resins on the bottom surface of the backboard sheet 300 or by attaching sheets made of UV, silicon, PU, rubber, etc. by means of adhesive, bonding agents or double-sided tapes.

The light guiding keypads 200 illustrated in FIGS. 1, 2, 3 and 4 are formed with materials flexible enough to be able to bend. So the light guiding keypads can be processed through other methods such as hot forming, etc., to have a desirable shape for being combined with the front housing 700. It is also possible to use the light guiding keypads 200 as it is without bended shapes.

In connection with the light guiding keypads in FIG. 1 and FIG. 3, it is possible to use a light guiding plate made of materials having transparency such as PU, UV, silicon, rubber, etc. and formed with certain shape over the upper surface to be keytop of the keypad.

Figure 5:
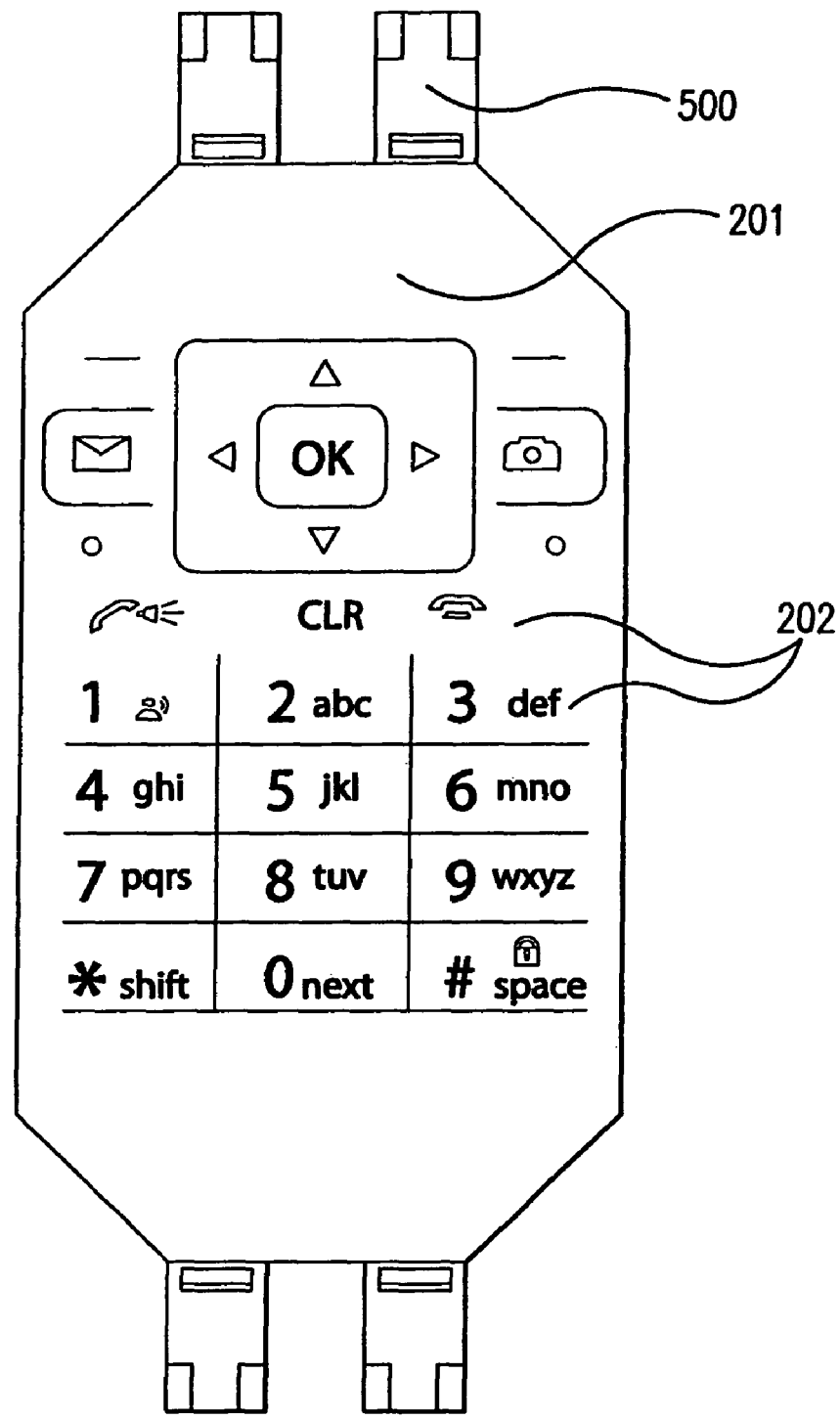
FIG. 5 illustrates a light guiding keypad of the present invention.

FIG. 5 illustrates the light guiding keypad according to the present invention.

The light guiding keypad illustrated in FIG. 5 comprises key character patterns formed by printing paste having diffusion and reflection features on the bottom or the top surface of the light guiding plate 201 made of transparent materials. The key character patterns can be implemented with various colors. It is known from FIG. 5 that the shape of the character patterns is not limited.

LEDs for illumination are connected to the side surface of the light guiding keypad illustrated in FIG. 5 and FPCB for activating the LEDs is connected to the respective LEDs. The number of LEDs and where the LEDs are connected can be freely selected so that where the LEDs are connected and the number of LEDs according to the present invention are not limited to the illustrations of FIG. 5.

FIG. 6 illustrates light guiding keypad assemblies implemented according to the present invention.

Both (A) and (B) of FIG. 6 illustrate light guiding keypad assemblies practically implemented according to the present invention. In those light guiding keypad assemblies, white color is used for basic key character patterns, green color is used for 'SEND' button, and red color is used for 'PWR END' button. Implementation of colors of the key character patterns is possible by printing paste of desirable color on one surface of the light guiding surface, as illustrated before.

Further, both keypad assemblies have unique background patterns and the patterns are implemented by keypad design layer or backboard sheet placed below the light guiding plate. The patterns are implemented with various colors and shapes as illustrated in FIG. 6.

The light guiding keypad assembly according to the present invention excludes the components of the conventional keypad structure necessarily used for the conventional mobile phones by forming key characters with various shapes and colors on one surface of the light guiding plate made of transparent materials through printing so that it is possible to successfully produce slim keypad assembly of mobile phones.

It is possible to insert desirable colors or shapes of drawings or pictures as background of the keypad, rather than conventional keypad background of all consistent black colors, by equipping with backboard sheet or keypad design layer for keypad design below the light guiding plate with key character patterns formed.

The invention claimed is:

1. A light guiding keypad assembly, comprising a light guiding plate comprised of transparent material and a light source connected to a side surface of the light plate, the light guiding plate guiding light from the light source to an upper part of the keypad assembly, wherein key character patterns are formed on one surface of the light guiding plate, and wherein the light guiding plate is flexible enough to be bendable.

2. The light guiding keypad according to claim 1, wherein some of the key character patterns are color patterns.

3. A light guiding keypad assembly, comprising a light guiding plate of transparent material and a light source connected to a side surface of the light guiding plate, the light guiding plate guiding light from the light source to an upper part of the keypad assembly, wherein key character patterns are formed on one surface of the light guiding plate, and wherein the transparent material is flexible enough to be bendable.

4. The light guiding keypad assembly according to claim 3, further comprising a coating layer on the light guiding plate, the coating layer covering at least some of the light guiding plate.

5. The light guiding keypad assembly according to claim 3, further comprising a backboard sheet below the light guiding plate, wherein drawings or pictures are formed on a surface of the backboard sheet.

6. The light guiding keypad assembly according to claim 3, further comprising an actuator and dome switches, the dome switches being located below the light guiding plate and the actuator comprising protrusions corresponding to each key character pattern, the protrusions abutting the dome switches to operate the dome switches by being pressed against the dome switches.

7. A light guiding keypad assembly, comprising a light guiding plate comprised of transparent material, a light source connected to a side surface of the light guiding plate, the light guiding plate guiding light from the light source to an upper part of the keypad assembly, and a backboard sheet below the light guiding plate, wherein drawings or pictures are formed on one surface of the backboard sheet and wherein key character patterns are formed on one surface of the light guiding plate.

8. The light guiding keypad assembly according to claim 7, further comprising an actuator which comprises protruding parts and dome switches operatively connected to the light source, locations of the protrusions corresponding to locations of the dome switches, the protrusions abutting the dome switches to operate the dome switches by being pressed against the dome switches thereby to activate the light source plate.

9. A light guiding keypad assembly according to claim 8, wherein the actuator is printed on the backboard sheet.

10. A light guiding keypad assembly, comprising:
a transparent light guiding plate and a transparent ink layer,
and further comprising a light source connected to a side surface of the light guiding plate, the light guiding plate guiding light from the light source to an upper part of the keypad assembly, wherein line type key character patterns are formed on one surface of the light guiding plate, wherein the transparent ink layer is formed on the surface where the line type key character patterns are formed to cover the key character patterns, and wherein drawings or pictures are printed on the transparent ink layer.

11. The light guiding keypad assembly according to claim 10, further comprising:
a coating layer covering at least some of the light guiding plate.

12. The light guiding keypad assembly according to claim 10, further comprising:
an actuator which comprises protruding parts and dome switches operatively connected to the light source, locations of the protrusions corresponding to locations of the dome switches, the protrusions abutting the dome switches to operate the dome switches by being pressed against the dome switches thereby to activate the light source.

13. The light guiding keypad assembly according to claim 12, wherein the actuator is printed on the transparent ink layer.

14. A light guiding keypad assembly, comprising:
a light guiding plate and a key character printed layer,
and further comprising a light source connected to a side surface of the light guiding plate, the light guiding plate guiding light from the light source to an upper part of the keypad assembly, wherein at least one of surface pattern, dot pattern, halftone pattern is formed on some part of one surface of the light guiding plate by printing materials which diffuse light, wherein the key character printed layer has key character areas corresponding to areas of the pattern on the light guiding plate and is located above the light guiding plate, and wherein the key character printed layer is formed with equal thickness leaving the shape of key characters of the key character areas empty.

15. The light guiding keypad assembly according to claim 14, further comprising a transparent ink layer of transparent material formed on one surface of the light guiding plate, wherein the key character printed layer is formed on the transparent ink layer.

16. The light guiding keypad assembly according to claim 14 or claim 15, further comprising a backboard sheet below the light guiding plate, wherein drawings or pictures are formed on one surface of the backboard sheet.

17. The light guiding keypad assembly according to claim 16, further comprising:
an actuator comprising protrusions printed on the backboard sheet and dome switches operatively connected to the light source, locations of the protrusions corresponding to locations of the dome switches, the protrusions abutting the dome switches to operate the dome switches by being pressed against the dome switches thereby to activate the light source.

18. The light guiding keypad according to claim 1, wherein the key character pattern is formed in line type.

* * * * *